United States Patent [19]

Jennings, Jr. et al.

[11] Patent Number: 5,339,904

[45] Date of Patent: Aug. 23, 1994

[54] OIL RECOVERY OPTIMIZATION USING A WELL HAVING BOTH HORIZONTAL AND VERTICAL SECTIONS

[75] Inventors: Alfred R. Jennings, Jr.; Ibrahim S. Abou-Sayed, both of Plano, Tex.

[73] Assignee: Mobil Oil Corporation, Fairfax, Va.

[21] Appl. No.: 988,498

[22] Filed: Dec. 10, 1992

[51] Int. Cl.$^5$ .............................................. E21B 43/24
[52] U.S. Cl. ................................. 166/303; 166/313
[58] Field of Search ............... 166/303, 313, 52, 272

[56] References Cited

U.S. PATENT DOCUMENTS

| | | | |
|---|---|---|---|
| 4,522,263 | 6/1985 | Hopkins et al. | 166/303 X |
| 4,612,990 | 9/1986 | Shu | 166/303 X |
| 4,617,996 | 10/1986 | Shu | 166/273 |
| 4,640,359 | 2/1987 | Livesey et al. | 166/303 X |
| 4,646,836 | 3/1987 | Goodhart | 166/303 |
| 4,678,036 | 7/1987 | Hartman et al. | 166/273 |
| 4,756,369 | 7/1988 | Jennings, Jr. et al. | 166/272 |
| 4,834,178 | 5/1989 | Knecht et al. | 166/313 X |
| 4,844,158 | 7/1989 | Jennings, Jr. | 166/267 |
| 4,982,786 | 1/1991 | Jennings, Jr. | 166/303 X |
| 5,014,787 | 5/1991 | Duerksen | 166/313 X |
| 5,024,275 | 6/1991 | Anderson et al. | 166/303 |

*Primary Examiner*—William P. Neuder
*Attorney, Agent, or Firm*—Alexander J. McKillop; George W. Hager, Jr.

[57] ABSTRACT

A steam, carbon dioxide, or solvent injection method is used in combination with a cased well completed to have an upper vertical section, a lower vertical section and a horizontal section which connects the two vertical sections. Steam, carbon dioxide, or solvent is injected down tubing in the well and through perforations near the lower portion of the lower vertical section of the well and into an oil-bearing formation that is penetrated by the well. Oil is produced from the formation via perforations in the casing in the upper vertical section and thence upward through the annulus formed between the tubing and the casing to the surface of the earth for recovery.

16 Claims, 3 Drawing Sheets

OIL RECOVERY OPTIMIZATION USING A WELL HAVING BOTH HORIZONTAL AND VERTICAL SECTIONS

FIELD OF THE INVENTION

This invention relates to the recovery of oil from an oil-bearing formation that is penetrated by a well having two vertical sections and one connecting horizontal section and wherein a fluid is injected into the formation to stimulate production of oil therefrom.

BACKGROUND OF THE INVENTION

Numerous enhanced oil recovery (EOR) processes and systems have been described and used. Though EOR processes have applications in increasing the recovery of all oils or hydrocarbons from oil-bearing formations they have particular applications in increasing the recovery of the more viscous oils from oil-bearing formations. In general the higher the viscosity of oils in their natural state in an oil-bearing formation, the more difficult it is to produce the oils from the formation. Thus in general a greater amount of high viscosity oil is left in an oil-bearing formation after primary production than is the case in formations having lower viscosity oil therein. Therefore EOR processes find their greatest applications in high viscosity oil-bearing formations.

EOR processes employ displacing fluids which include steam, carbon dioxide, and solvents. EOR processes also employ various combinations of wells including single wells and multiple wells in various patterns.

In U.S. Pat. No. 4,617,996 there is described a method of recovering oil from an oil-bearing formation by injecting a displacing fluid into the formation through an injection well and recovering fluids from a production well which is at a horizontal distance from the injection well. The displacing fluid used is one which is immiscible or near-innmiscible with the oil at the oil-bearing reservoir conditions. A mixture of carbon dioxide and a light hydrocarbon such as ethane is described as a preferred displacing fluid. U.S. Pat. No. 4,678,036 describes a miscible flooding process for oil recovery which employs a multiple contact miscible solvent such as carbon dioxide and an additive such as butane which lowers the minimum miscibility pressure of the oil/solvent system. U.S. Pat. No. 4,756,369 describes a process for recovering viscous heavy oil from a substantially shallow reservoir wherein liquid carbon dioxide, a spacer of a vaporizable drive fluid, followed by steam is used.

U.S. Pat. No. 4,844,158 describes a method for stimulating the recovery of viscous oil from a formation penetrated by at least one horizontal wellbore. The wellbore is filled with a solvent such as xylene, toluene, diesel oil, kerosene or mixtures thereof and is displaced from the wellbore upward into the formation by a second fluid having a density greater than the solvent. The solvent mixes with the viscous oil in the formation to reduce the viscosity of the viscous oil. Thereafter injection of the second fluid is stopped and the fluids and oil of reduced viscosity are allowed to flow by gravity into the horizontal wellbore. Suitable second fluids include sea water, brackish water, and aqueous solutions of potassium chloride, sodium chloride, calcium chloride, zinc bromide, potassium bromide, sodium bromide, calcium bromide, and mixtures thereof.

SUMMARY OF THE INVENTION

This invention is directed to producing oil from a subterranean oil-bearing formation. A cased wellbore is provided that extends into the formation and has a first vertical section that extends from the upper part of the formation thereinto, a second horizontal section that extends from the lower end of the first section, and a third vertical section that extends from the end of the second section that is located horizontally from the first section, into the lower part of the formation. Tubing is provided in the wellbore and terminates near the lower part of the formation. A first packer is provided about the tubing near the lower end of the tubing, and a second packer is provided about the tubing near the lower end of the first section. A first set of perforations are provided through the cased wellbore below the first packer and a second set of perforations are provided through the cased wellbore above the second packer. A fluid is injected down the tubing through the first set of perforations and into the formation to enhance the production of oil from the formation and oil is produced through the second set of perforations into the annulus formed about the tubing and inside of the casing and upward to the surface of the earth for recovery.

DESCRIPTION OF THE PREFERRED EMBODIMENTS

Figure 1:
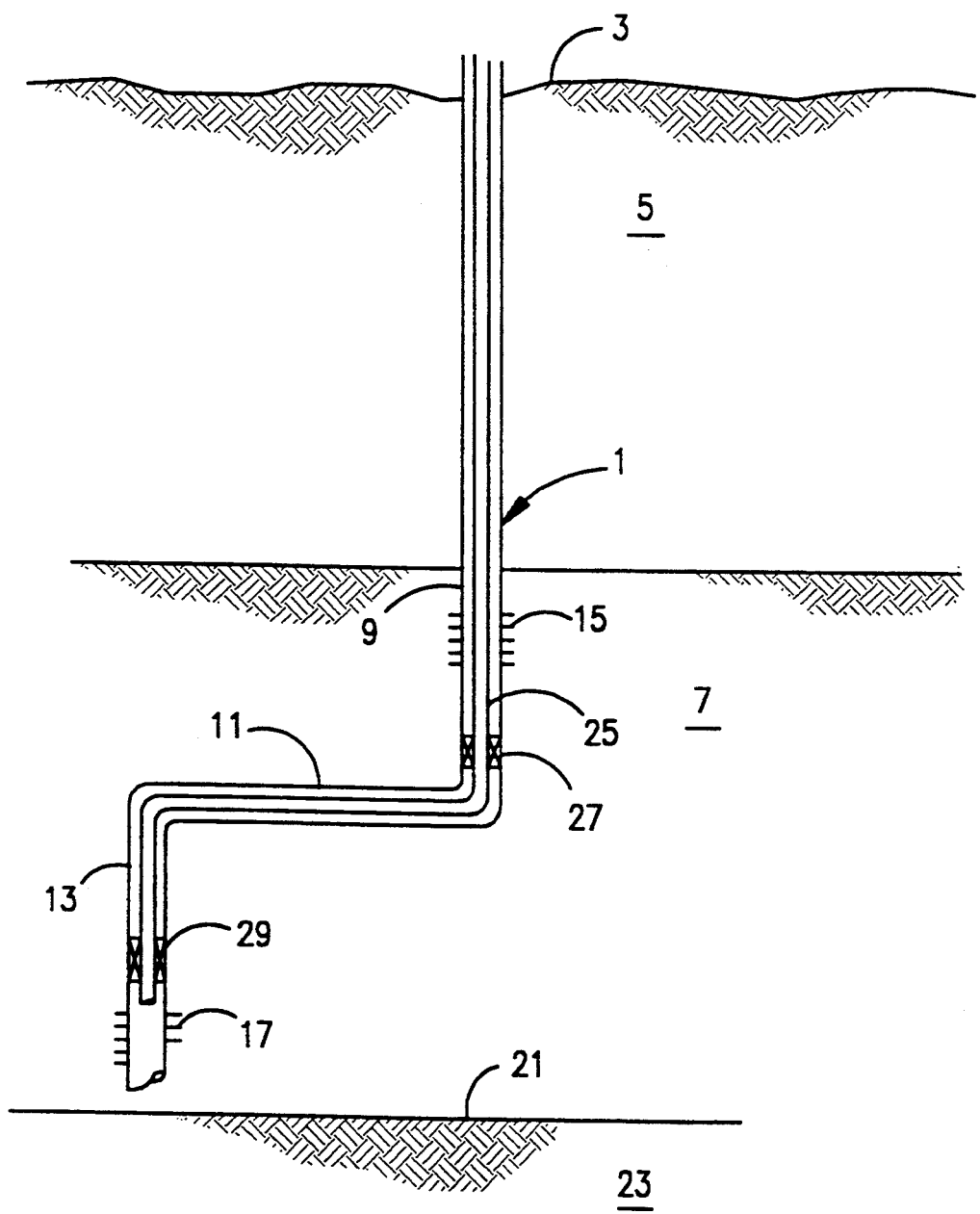
FIG. 1 is a schematic illustration of one embodiment of the invention.

With reference to FIG. 1 a cased wellbore 1 is provided to extend form the surface of the earth 3 through the overburden 5 and into a subterranean oil-bearing formation 7. The wellbore 1 has a first section 9, that extends essentially vertically through the upper boundary of formation 7 and into formation 7, a second section 11 that extends essentially horizontally from the lower end of first section 9 into formation 7, and a third section 13 that extends essentially vertically downward from the end of the second section 11 that is opposite the end which communicates with the first section 9. The third vertical section 13 normally terminates near the lower boundary 21 of formation 7 though it may extend into underlying formations 23. A first set of perforations 15 is provided through the casing (not shown) to open communication between the wellbore 1 and the upper part of formation 7, and a second set of perforations 17 is provided through the casing to open communication between the wellbore 1 and the lower part of formation 7. Tubing 25 is provided in the cased wellbore 1 to extend from the surface of the earth 3 to near the lower end of the wellbore 1 and the second set of perforations 17. A first packer 29 is provided about the tubing 25 and above the first set of perforations 17. A second packer 27 is provided about the tubing 25 below the first set of perforations 15 and above the second packer 29.

After providing and completing the wellbore 1 a fluid is injected down the tubing 25 and through the first set of perforations 17 and into the formation 7 to enhance the production of oil from the formation, and oil is produced from the formation through the second set of perforations 15 and into the annulus formed intermediate the tubing and the inside of the casing and thence upward to the surface of the earth for recovery. Various types of fluids are suitable for injection into the formation to enhance the production of oil therefrom. Steam is one such suitable fluid. Carbon dioxide is another suitable fluid. Solvents are also suitable fluids for injecting into the formation to enhance the production of oil therefrom. Suitable solvents may be selected from the group consisting of saturated liquid hydrocarbons having from 2 to 10 carbon atoms.

In a further embodiment a solvent selected from the group comprising xylene, toluene, diesel oil, kerosene and mixtures thereof is injected down the tubing through the first set of perforations and into the formation, and a second fluid is injected down the tubing following the solvent to displace the solvent from the tubing and into the formation. The second fluid is selected from the group consisting of aqueous solutions of potassium chloride, sodium chloride, calcium bromide, zinc bromide and mixtures thereof.

In a further embodiment of the invention the second horizontal section of the wellbore is provided in the formation in a direction to maximize the production of oil from the formation. The direction selected may vary with the particular formation being treated. For example in some formations the second section will be provided to extend into the formation in a direction perpendicular to the direction of the least principal in-situ stress of the formation in order to best utilize the natural fractures of the formation. In other formations the second horizontal section will be provided into the formation in a direction essentially parallel to the direction of natural fractures in the formation. One skilled in the art of oil production can determine the preferred direction to extend the second horizontal section into the formation.

Figure 2:
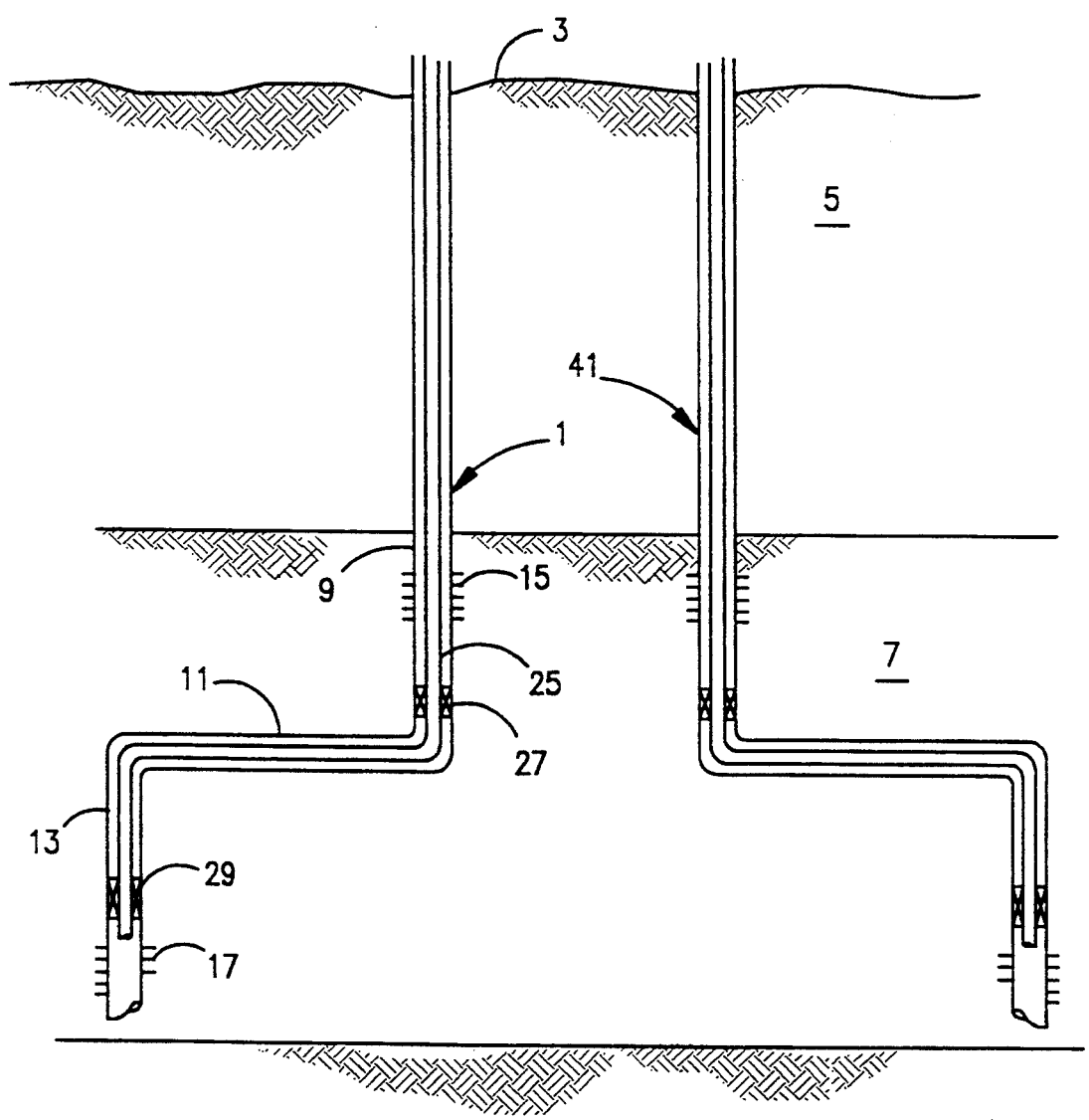
FIG. 2 is a schematic illustration of a second embodiment of the invention.

With reference to FIG. 2 there are shown two wellbores 1 and 41 spaced horizontally apart but in close proximity one to the other. The wells 1 and 41 are normally spaced within the drainage of a production pattern being used. In the case of a 40-acre pattern the wells 1 and 41 are normally spaced within the range of 66 to 660 feet apart. Both wells are completed the same. Fluids to enhance the production of oil from the formation are injected down each well as was described for well 1 and with reference to FIG. 1. The oil displaced from formation 7 by fluid being injected down wells 1 and 41 is produced via the upper perforations in each of the wells and thus produced to the surface of the earth.

Two wells placed as shown in FIG. 2 would allow optimization of steam flood and solvent fronts to cover a large portion of the drainage area. The system using two or more wells would help provide flow paths from the injected area to the upper producing perforations. If desirable the injection/ production scheme could be reversed whereby injection occurred through the upper perforations and production through the lower perforations. Either system could be optimized with fluid densities as discussed in the cited patent references.

Figure 3:
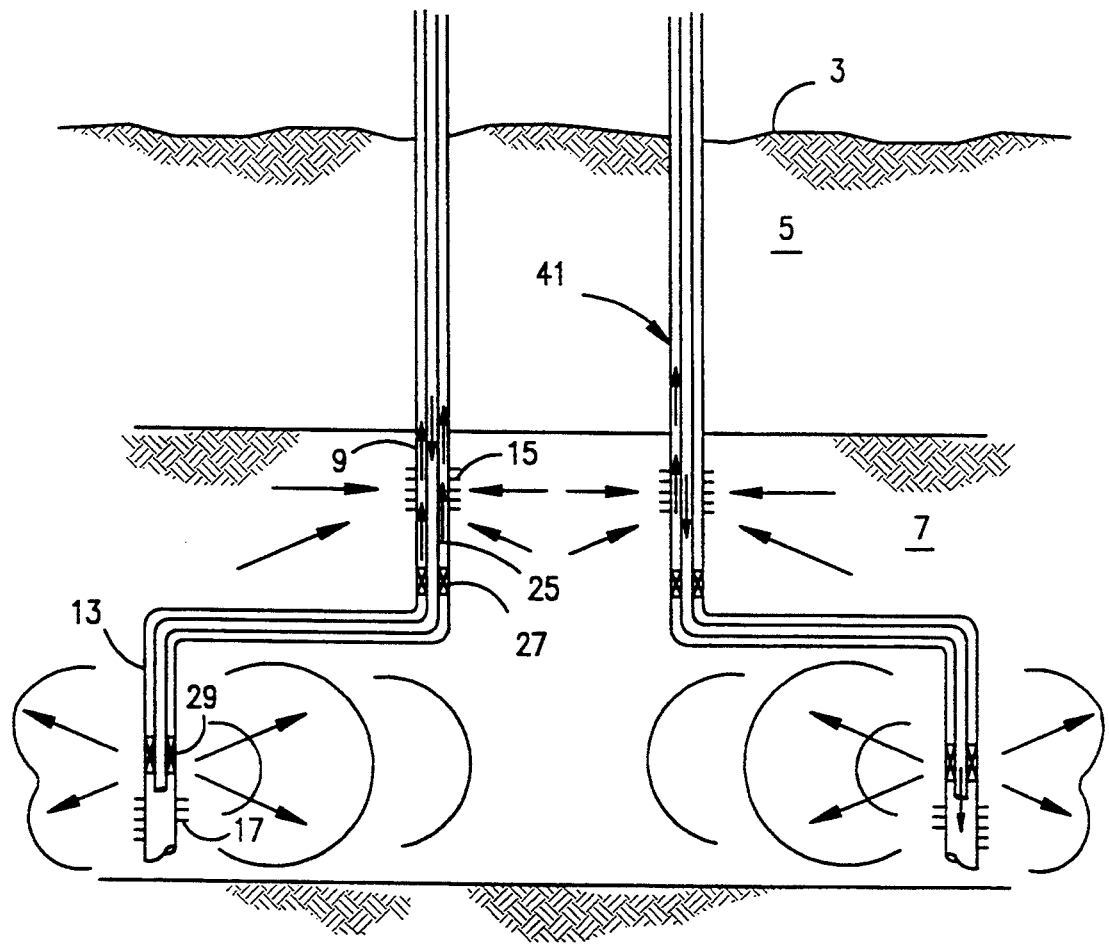
FIG. 3 is a schematic illustration of further embodiments of the invention.

This invention is further described with reference to FIG. 3 which depicts an active injection/production system for at least two wellbores. As seen from this FIGURE, the described system would be adaptable for various formation thicknesses and for several distances between wellbores in a multi-well scheme.

Having described specific embodiments of the instant invention, it will be understood that further modifications thereof may be suggested to those skilled in the art, and it is intended to cover all such modifications as fall within the scope of the appended claims.

What is claimed is:

1. A method of producing oil from a subterranean oil-bearing formation comprising:
   a) providing a cased wellbore that extends from the surface of the earth into said oil-bearing formation, said wellbore having a first section that extends vertically from the upper part of said formation into said formation, a second section that extends from the lower end of said first section horizontally into said formation in a direction to maximize oil production from said formation, and a third section that extends vertically from the end of said second section that is opposed to said first section toward the lower part of said formation, whereby said first and third vertical sections are horizontally spaced from one another;
   b) providing tubing in said cased wellbore that extends toward and near the lower part of said formation;
   c) providing a first packer about said tubing near the lower end of said tubing;
   d) providing a second packer about said buting near the lower end of said first section;
   e) providing a first set of perforations through said cased wellbore below said first packer and providing a second set of perforations through said cased wellbore above said second packer;
   f) injecting a fluid dow said tubing through said first set of perforations and into said formation to enhance the production of oil from said formation; and
   g) producing oil from said formation through said second set of perforations into the annulus formed about the tubing and inside the casing and upward to the surface of the earth for recovery.

2. The method of claim 1 wherein in step (f) the fluid injected down said tubing is steam.

3. The method of claim 1 wherein in step (f) the fluid injected down said tubing is carbon dioxide.

4. The method of claim 1 wherein in step (f) the fluid injected down said tubing is a solvent selected from the group consisting of saturated liquid hydrocarbons having from 2 to 10 carbon atoms.

5. The method of claim 1 wherein in step (f) said solvent is selected from the group comprising xylene, toluene, diesel oil, kerosene and mixtures thereof, and wherein a second fluid is injected down said tubing following said solvent to displace said solvent from said tubing and into said formation, said second fluid being selected from the group consisting of aqueous solutions of potassium chloride, sodium chloride, calcium chloride, zinc bromide, potassium bromide, sodium bromide, calcium bromide, and mixtures thereof.

6. The method of claim 1 wherein in step (a) said second section of said wellbore is provided to extend into said formation in a direction perpendicular to the direction of the least principal in-situ stress of the formation.

7. The method of claim 6 wherein in step (f) said solvent is selected from the group comprising xylene, toluene, diesel oil, kerosene and mixtures thereof, and wherein a second fluid is injected down said tubing following said solvent to displace said solvent from said tubing and into said formation, said second fluid being selected from the group consisting of aqueous solutions of potassium chloride, sodium chloride, calcium chloride, zinc bromide, potassium bromide, sodium bromide, calcium bromide, and mixtures thereof.

8. The method of producing oil from a subterranean oil-bearing formation comprising;
   a) providing dual cased wellbores spaced horizontally apart one from the other that extend from the surface of the earth into said oil-bearing formation, said wellbore having a first section that extends vertically from the upper part of said formation into said formation in a direction to maximize oil production from said formation, having a second section that extends from the lower end of said first section horizontally into said formation, and having a third section that extends vertically from the end of said toward the lower part of said formation, whereby said first and second vertical sections are horizontally spaced from one another;
   b) providing tubing in said dual cased wellbores that extends toward and terminates near the lower part of said formation;
   c) providing a first packer in said dual cased wellbores about said tubing near the lower end of said tubing;
   d) providing a second packer in said dual cased wellbores about said tubing near the lower end of said first section;
   e) providing a first set of perforations through said dual cased wellbores below said first packer and providing a second set of perforations through said dual cased wellbores above said second packer;
   f) injecting a fluid down said tubing in said dual cased wellbores through said first set of perforations and into said formation to enhance the production of oil from said formation; and
   g) producing oil from said formation through said second set of perforations in said dual wellbores into the annulus formed about the tubing and inside of the casing and upward to the surface of the earth for recovery.

9. The method of claim 8 wherein in step (f) the fluid injected down said tubing is steam.

10. The method of claim 8 wherein in step (f) the fluid injected down said tubing is carbon dioxide.

11. The method of claim 8 wherein the step (f) the fluid injected down said tubing is a solvent selected from the group consisting of saturated liquid hydrocarbons having from 2 to 10 carbon atoms.

12. The method of claim 8 wherein in step (f) said solvent is selected from the group comprising xylene, toluene, diesel oil, kerosene and mixtures thereof, and wherein a second fluid is injected down said tubing following said solvent to displace said solvent from said tubing and into said formation, said second fluid being selected from the group consisting of aqueous solutions of potassium chloride, sodium chloride, calcium chloride, zinc bromide, potassium bromide, sodium bromide, calcium bromide, and mixtures thereof.

13. The method of claim 8 wherein in step (a) said second section of said wellbore is provided to extend into said formation in a direction perpendicular to the direction of the least principal in-situ stress of the formation.

14. The method of claim 13 wherein in step (f) said solvent is selected from the group comprising xylene, toluene, diesel oil, kerosene and mixtures thereof, and wherein a second fluid is injected down said tubing following said solvent to displace said solvent from said tubing and into said formation, said second fluid being selected from the group consisting of aqueous solutions of potassium chloride, sodium chloride, calcium chloride, zinc bromide, potassium bromide, sodium bromide, calcium bromide, and mixtures thereof.

15. A method of producing oil from a subterranean oil-bearing formation utilizing a single cased wellbore, comprising the steps of:
   a) providing a fluid injection section of said cased wellbore that extends vertically into said formation;
   b) providing an oil production section of said cased wellbore that extends vertically into the formation and is spaced horizontally from said fluid injection section in a direction perpendicular to the least principal in-situ stress of the formation;
   c) injecting fluid down said cased wellbore and out through said fluid injections ections into said formation to enhance the production of oil from said formation;
   d) producing oil from said formation through said oil production sections and upward through said cased wellbore to the surface of the earth whereby natural fractures within the formation are utilized to maximize said oil production.

16. A method for producing oil from a subterranean oil-bearing formation utilizing dual cased wellbores, comprising the steps of:
   a) providing a fluid injection section of each of said dual cased wellbores that extend vertically into said formation;
   b) providing an oil production section of each of said dual cased wellbores that extend vertically into the formation and are spaced horizontally from the fluid injection section of each of said cased wellbores in a direction perpendicular to the least principal in-situ stress of the formation;
   c) injecting fluid down said cased wellbores and out through said fluid injection sections of each of said cased wellbores into said formation to enhance the production of oil from said formation; and
   d) producing oil from said formation through said oil production sections and upward through said cased wellbores to the surface of the earth, whereby natural fractures within the formation are utilized to maximize said oil production.

* * * * *

UNITED STATES PATENT AND TRADEMARK OFFICE
CERTIFICATE OF CORRECTION

PATENT NO. : 5,339,904
DATED : August 23, 1994
INVENTOR(S) : A. R. Jennings, Jr. et al.

It is certified that error appears in the above-indentified patent and that said Letters Patent is hereby corrected as shown below:

Col. 4, line 27, Claim 1, Sub. Paragraph (D), line 1 delete "buting" and insert --tubing --.

Col. 4, line 33, Claim 1, Sub Paragraph (F), line 1, delete "dow" and insert --down--.

Col. 5, line 18, Claim 8, line 12 after "said" insert -- second section that is opposed to said first section--.

Col. 6, line 30, Claim 15, Sub Paragraph (C), line 2, after "injections" delete "ections" and insert --sections--.

Signed and Sealed this

First Day of November, 1994

Attest:

BRUCE LEHMAN

*Attesting Officer*   *Commissioner of Patents and Trademarks*